United States Patent
McBride et al.

(10) Patent No.: US 9,901,963 B2
(45) Date of Patent: Feb. 27, 2018

(54) SYSTEM FOR GROUNDWATER PROTECTION

(71) Applicants: Tom McBride, Lava Hot Springs, ID (US); Renee McBride, Lava Hot Springs, ID (US)

(72) Inventors: Tom McBride, Lava Hot Springs, ID (US); Renee McBride, Lava Hot Springs, ID (US)

( * ) Notice: Subject to any disclaimer, the term of this patent is extended or adjusted under 35 U.S.C. 154(b) by 52 days.

(21) Appl. No.: 15/175,185

(22) Filed: Jun. 7, 2016

(65) Prior Publication Data
US 2017/0348742 A1 Dec. 7, 2017

(51) Int. Cl.
| | |
|---|---|
| *B09C 1/00* | (2006.01) |
| *B32B 5/18* | (2006.01) |
| *B32B 25/04* | (2006.01) |
| *B32B 25/08* | (2006.01) |
| *B32B 27/06* | (2006.01) |
| *E21C 47/00* | (2006.01) |

(52) U.S. Cl.
CPC ............... *B09C 1/002* (2013.01); *B32B 5/18* (2013.01); *B32B 25/045* (2013.01); *B32B 25/08* (2013.01); *B32B 27/06* (2013.01); *E21C 47/00* (2013.01); *B32B 2266/0228* (2013.01); *B32B 2266/08* (2013.01); *B32B 2307/7265* (2013.01)

(58) Field of Classification Search
CPC ....... B09B 1/004; B09B 1/008; E02D 31/002; E02D 31/004; E02D 31/00; Y10S 210/901; Y02W 30/32; B32B 27/06; B32B 5/18; B32B 25/045; B32B 25/08; B32B 2266/08; B09C 1/002

USPC ............. 405/53, 60, 129.35, 129.45, 129.55, 405/129.6, 129.75, 129.9, 129.95
See application file for complete search history.

(56) References Cited

U.S. PATENT DOCUMENTS

| | | | | |
|---|---|---|---|---|
| 4,194,855 A | * | 3/1980 | Egger | E02D 31/004 210/901 |
| 4,375,930 A | * | 3/1983 | Valiga | E02D 31/00 405/129.55 |
| 4,464,081 A | * | 8/1984 | Hillier | B09B 1/00 405/128.15 |
| 4,908,129 A | * | 3/1990 | Finsterwalder | B09B 1/00 210/170.07 |

(Continued)

OTHER PUBLICATIONS

Breitenbach, J. A., "Backfilling depleted open pit mines with lined landfills, tailing impoundments, and ore heap leach pads for reduced cost", 2008, GeoAmericas Conference in Cancun, Mexico.*

*Primary Examiner* — Carib Oquendo
(74) *Attorney, Agent, or Firm* — The Law Office of Jerry D. Haynes

(57) ABSTRACT

A system and method for ground water protection below a pit mine that includes: a first back fill cover over an exposed ground water; layer of polystyrene foam; a rubber membrane placed over the first foam cover; closed cell extruded polystyrene foam placed over the rubber membrane; a layer of contaminated material over the closed cell extruded polystyrene foam, wherein the layer of contaminated material is covered by polystyrene foam, a rubber membrane and polystyrene foam over the rubber membrane; and top soil covering the layer of foam, rubber membrane and foam above the contaminated material.

2 Claims, 1 Drawing Sheet

(56) References Cited

U.S. PATENT DOCUMENTS

| | | | | |
|---|---|---|---|---|
| 5,190,406 | A | * | 3/1993 | Shannonhouse ...... E02D 31/004 405/129.6 |
| 5,857,807 | A | * | 1/1999 | Longo, Sr. ................ B09B 1/00 166/369 |
| 5,961,437 | A | * | 10/1999 | Smith ................... E02D 31/004 210/901 |
| 6,024,513 | A | * | 2/2000 | Hudgins .................. B09B 1/00 210/901 |
| 6,082,929 | A | * | 7/2000 | Williams ................. B09B 1/00 405/129.55 |
| 2005/0051480 | A1 | * | 3/2005 | Newman ................ E03F 1/002 210/129.6 |
| 2009/0286893 | A1 | * | 11/2009 | Shih ........................ B32B 5/18 521/54 |
| 2011/0283821 | A1 | * | 11/2011 | Ober ................. G01N 33/0031 73/866.1 |
| 2014/0272229 | A1 | * | 9/2014 | Xing ......................... C08J 9/12 428/36.5 |

* cited by examiner

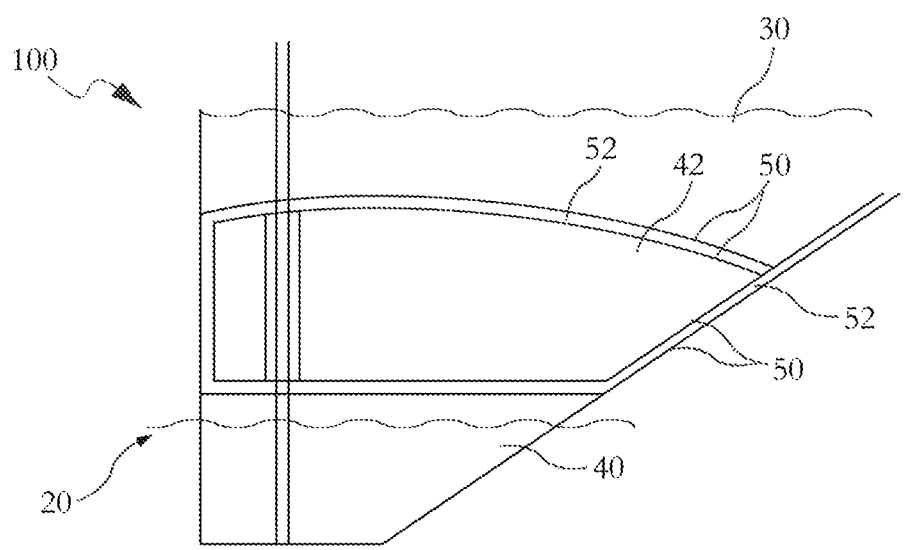

SYSTEM FOR GROUNDWATER PROTECTION

BACKGROUND OF THE INVENTION

Field of Invention

The present invention relates to a system to protect groundwater, in particular, exposed groundwater as a result of a pit mine.

Description of Related Art

An open pit mine can create groundwater issues due to exposure within these pit mines. Materials that are used to fill the pit mines is usually contaminated and as a result this contamination gets into the groundwater causing problems with the groundwater. Open pit mines create serious environmental problem for individuals that are dependent upon groundwater sources. As a result, it would be advantageous to have a system developed that shielded and protected groundwater from contaminants caused by pit mine fillings and ensures the groundwater remains in a potable condition.

SUMMARY OF THE INVENTION

The present invention relates to a system for ground water protection below a pit mine that includes: a first back fill cover over an exposed ground water; a layer of polystyrene foam placed on back fill; a rubber membrane placed over layer of polystyrene foam; closed cell extruded polystyrene foam placed over the rubber membrane; a layer of contaminated material over the closed cell extruded polystyrene foam, wherein the layer of contaminated material is covered by polystyrene foam, a rubber membrane and polystyrene foam over the rubber membrane; and top soil covering the layer of contaminated material. The polystyrene foam and rubber membrane will need to go up all sides of the pit mine also. The above system is implemented through a method including the following steps of: inserting a first layer of back fill over exposed water; placing a layer of polystyrene foam over back fill; placing a rubber membrane over the polystyrene foam; placing closed cell extruded polystyrene foam over the rubber membrane; depositing any contaminated material over the closed cell extruded polystyrene foam; and covering the contaminated material with a layer of top soil. Contaminated material will also have the foam and rubber membrane prior to placing top soil over it.

BRIEF DESCRIPTION OF DRAWINGS

FIG. 1 depicts a groundwater protection system according the present invention.

DETAILED DESCRIPTION

The present invention relates to a system to protect groundwater exposed within a pit mine. In particular, the present system includes the use of a backfill covering of exposed groundwater and placing a layer of polystyrene foam place on back fill; a rubber membrane over the first layer of backfill. This rubber membrane is sealed with the use of polystyrene foam. In particular, closed-cell extruded polystyrene foam is preferred for use over the rubber membrane. Then over this foam any contaminated materials as a result of the pit mine may be placed and filled back into the pit mine. Over the contaminated material is a layer of foam, rubber membrane and foam, then is a layer of topsoil that covers this contaminated material and preventing environmental exposure to this contaminated material. This system of groundwater protection therefore provides three layers of protection from the contaminated material and then seals the contaminated material below a top layer of ground soil. Therefore, rain/snow fall cannot penetrate the contaminated material and get into ground water.

FIG. 1 depicts the implementation of the system in accordance with the present invention with a pit mine 100. Groundwater 20 is shown below the layering as described in accordance with the present invention. A first layer of backfill 40 is provided directly over the groundwater 20 that is sealed through the use of polystyrene foam 50 and a rubber membrane 52. This polystyrene foam 50 and rubber membrane 52 covers backfill 40, which is preferably is in the form of clean soil and rock to ensure uncontaminated contact with the groundwater 20. Extruded polystyrene foam 50 is placed over the rubber membrane 52. The foam 50 provides an additional seal of the rubber membrane 52 and as a result the groundwater 20 is three layers removed from contaminated material 42 that is filled back into the pit mine 100 after complete use of the pit mine 100. This contaminated material 42 is then placed below a layer of polystyrene, rubber membrane and polystyrene, where a topsoil layer 30 is provided over this contaminated material 42 therefore placing the contaminated material 42 away from the groundwater 20 to ensure that the groundwater 20 is not contaminated. The instant invention has been shown and described in what it considers to be the most practical and preferred embodiments. It is recognized, however, that departures may be made there from within the scope of the invention and that obvious modifications will occur to a person skilled in the art.

What is claimed is:

1. A system for ground water protection below a pit mine comprising:
   a. a first back fill cover over an exposed ground water;
   b. a first layer of closed cell extruded polystyrene foam placed over back fill cover;
   c. a first rubber membrane placed over the first layer of polystyrene foam cover;
   d. a second layer of closed cell extruded polystyrene foam placed over the rubber membrane;
   e. a layer of contaminated material over the second layer of closed cell extruded polystyrene foam;
   f. a layer of polystyrene placed over the layer of contaminated material;
   g. a second rubber membrane over the layer of polystyrene;
   h. a second layer of polystyrene placed over the second rubber membrane;
   i. top soil covering the second layer of polystyrene above the contaminated material.

2. A method of protecting exposed ground water within a pit mine comprising the steps of:
   a. inserting a first layer of back fill over exposed water;
   b. placing a first layer of closed cell extruded polystyrene foam over the first layer of back fill cover;
   c. placing a first rubber membrane over the first layer of closed cell extruded polystyrene foam;
   d. placing a second layer of closed cell extruded polystyrene foam over the first rubber membrane;
   e. depositing any contaminated material over the second layer of closed cell extruded polystyrene foam;
   f. covering the contaminated material with a first layer of polystyrene;
   g. placing a second rubber membrane over the first layer of polystyrene;

h. placing a second layer of polystyrene over the second rubber membrane; and
i. placing a top soil covering over the second layer of polystyrene above the contaminated material.

* * * * *